US012723118B2

(12) United States Patent
Ajellal et al.

(10) Patent No.: US 12,723,118 B2
(45) **Date of Patent: *Sep. 1, 2026**

(54) ETHYLENE-OCTENE COPOLYMERS WITH IMPROVED PROPERTY PROFILE

(71) Applicant: Borealis AG, Vienna (AT)

(72) Inventors: Noureddine Ajellal, Kulloo (FI); Mohammad Al-haj Ali, Kulloo (FI); Joy Jie Cheng, Linz (AT); Elena Pomakhina, Linz (AT); Andreas Albrecht, Linz (AT); Pritish Pradipkumar Sinha, Maharashtra (IN)

(73) Assignee: BOREALIS GMBH, Vienna (AT)

( * ) Notice: Subject to any disclaimer, the term of this patent is extended or adjusted under 35 U.S.C. 154(b) by 690 days.

This patent is subject to a terminal disclaimer.

(21) Appl. No.: 18/022,595

(22) PCT Filed: Sep. 27, 2021

(86) PCT No.: PCT/EP2021/076519

§ 371 (c)(1),
(2) Date: Feb. 22, 2023

(87) PCT Pub. No.: WO2022/069411

PCT Pub. Date: Apr. 7, 2022

(65) Prior Publication Data

US 2023/0312789 A1 Oct. 5, 2023

(30) Foreign Application Priority Data

Sep. 30, 2020 (EP) .................................... 20199153

(51) Int. Cl.

| | |
|---|---|
| ***C08F 210/16*** | (2006.01) |
| ***C08F 2/00*** | (2006.01) |
| ***C08F 2/06*** | (2006.01) |
| ***C08F 4/52*** | (2006.01) |
| ***C08F 4/6592*** | (2006.01) |
| ***C08F 10/02*** | (2006.01) |
| ***C08F 255/02*** | (2006.01) |
| ***C08F 255/08*** | (2006.01) |

(52) U.S. Cl.

CPC ............ *C08F 210/16* (2013.01); *C08F 2/001* (2013.01); *C08F 2/06* (2013.01); *C08F 4/52* (2013.01); *C08F 4/65927* (2013.01); *C08F 255/02* (2013.01); *C08F 255/08* (2013.01); *C08F 2500/12* (2013.01); *C08F 2500/28* (2021.01); *C08F 2500/29* (2021.01)

(58) Field of Classification Search

CPC ........................... C08F 210/16; C08F 4/65927

See application file for complete search history.

(56) References Cited

U.S. PATENT DOCUMENTS 7,795,365 B2 * 9/2010 Karjala ................. C08F 210/16 208/18
8,034,878 B2 * 10/2011 Karjala ................... C08F 10/00 525/240
8,173,232 B2 * 5/2012 Mandare ................ C08F 10/00 428/339

(Continued)

FOREIGN PATENT DOCUMENTS

CN 110234665 A 9/2019
CN 110475793 A 11/2019

(Continued)

OTHER PUBLICATIONS

Chinese Office Action for Application No. 202180065233.8 Dated Mar. 27, 2024.
Yiyong He, et al. Terminal and Internal Unsaturations in Poly(ethylene-co-1-octene) Macromolecules 2014 pp. 1-9.
International Search Report of Application No. PCT/EP2021/076519 Dated Dec. 7, 2021.
Anonymous "Exact 0210 octene-1 plastomer" Dexplastomers Mar. 1, 2022.

*Primary Examiner* — Rip A Lee
(74) *Attorney, Agent, or Firm* — Lippes Mathias LLP

(57) ABSTRACT

Ethylene-1-octene copolymer characterized by a density in the range of 850 $kg/m^3$ to 930 $kg/m^3$ measured according to ISO 1183-187, a melt flow rate MFR2 (190° C., 2.16 kg) in the range of from 0.3 g/10 min to 100 g/10 min measured according to ISO 1133, a $MFR_{10}/MFR_2$ of from 5.0 to 15.0, a Mw/Mn of from 2.0 to 5.0, 1.0 to below 20 vinyl unsaturation units/100,000 C atoms, more than 5.0 to 35 vinylidene unsaturation units/100,000 C atoms, more than 5.0 to 30 vinylene unsaturation units/100,000 C atoms, more than 15.0 to 60 trisubstituted unsaturation units/100,000 C atoms, 26 to 150 total unsaturation units/100,000 C atoms, wherein the total unsaturation units/100,000 C atoms is the sum of vinyl unsaturation units/100,000 C atoms, vinylidene unsaturation units/100,000 C atoms, vinylene unsaturation units/100,000 C atoms and trisubstituted unsaturation units/100,000 C atoms, an unsaturation degree for unsaturation types e) to h) according to formula (I) wherein a vinyl unsaturation degree is in the range of from 5.0 to 15.0%, a vinylene unsaturation degree is in the range of from 20.0 to 30.0%, and wherein the sum of the vinyl unsaturation degree and vinylidene unsaturation degree is at least 30.0% and up to 50.0%.

$$\text{unsaturation}_{Type}\ \text{degree}\ (\%) = \frac{\text{unsaturation}_{Type}\ \text{units}/100,000\ \text{C atoms}}{\text{total unsaturation units}/100,000\ \text{C atoms}} * 100 \qquad (I)$$

19 Claims, No Drawings

(56) References Cited

U.S. PATENT DOCUMENTS 8,372,931 B2 * 2/2013 Hermel-Davidock ..... C08J 5/18 526/348
8,389,086 B2 * 3/2013 Mandare ................ C08F 10/00 428/339
8,629,214 B2 * 1/2014 Karjala .................. C08L 23/06 525/240
8,829,115 B2 * 9/2014 Hermel-Davidock ...................... C08L 23/04 526/348
8,835,567 B2 * 9/2014 Demirors ................ C08L 23/14 525/240
9,115,275 B2 * 8/2015 Kupar ................. C08L 23/0815
9,133,327 B2 * 9/2015 Wu ......................... C08L 23/10
9,828,476 B2 * 11/2017 Bensason ................ B32B 27/32
9,834,712 B2 * 12/2017 Kapur ..................... B32B 27/36
10,618,799 B2 * 4/2020 Shah ........................ D04H 3/16
11,192,963 B2 12/2021 Fait et al.
11,845,836 B2 * 12/2023 Ruskeeniemi ........ C08F 255/02
12,275,810 B2 * 4/2025 Sun ......................... C08F 10/02
12,540,206 B2 * 2/2026 Ajellal .................. C08F 210/02
2011/0003940 A1 * 1/2011 Karjala ................... C08F 10/00 526/348.4
2011/0290317 A1 * 12/2011 Naumovitz ........... H10F 19/804 136/256
2012/0129417 A1 * 5/2012 Taha ................... C08L 23/0815 525/240
2013/0206224 A1 * 8/2013 Naumovitz ............. C08L 23/08 361/728
2013/0233383 A1 * 9/2013 Naumovitz ............. C08L 23/08 136/259
2017/0210890 A1 * 7/2017 Karjala ............... C08L 23/0815
2020/0079887 A1 3/2020 Ajellal et al.
2022/0073658 A1 * 3/2022 Sun ....................... C08F 210/16
2022/0389139 A1 * 12/2022 Wu ........................ G01N 30/14
2023/0287158 A1 * 9/2023 Ajellal ................ C08L 23/0815
2023/0295354 A1 * 9/2023 Ajellal ................ C08L 23/0815 525/240

FOREIGN PATENT DOCUMENTS

EP 3239195 A1 11/2017
EP 2580279 B1 * 1/2019 .............. C08L 23/08
MY 160184 A * 2/2017 .............. C08F 10/00
RU 2248885 C2 2/2003
RU 2012135570 A1 2/2014
WO 0012309 A1 3/2000
WO 2011089112 A1 7/2011
WO 2020070034 A1 4/2020
WO 2020178010 A1 9/2020

* cited by examiner

ETHYLENE-OCTENE COPOLYMERS WITH IMPROVED PROPERTY PROFILE

CROSS REFERENCE TO RELATED APPLICATIONS

This is a 371 of PCT Application No. PCT/EP2021/076519, filed Sep. 27, 2021, which claims the benefit of European Application No. 20199153.6, filed Sep. 30, 2020, the contents of which are incorporated herein in their entirety.

The present invention relates to ethylene-1-octene copolymers with an improved property profile, e.g. an improved balance of unsaturation levels, molecular weight distribution (MWD) and MFR10/MFR2 ratio. The invention further relates to a solution polymerization process using specific catalyst systems for preparing these ethylene-1-octene copolymers. The invention also relates to the use of these ethylene-1-octene copolymers for grafting and/or crosslinking.

BACKGROUND OF THE INVENTION

There have been many varieties of polyethylene polymers polymerized over the years, including those made using high pressure free radical chemistry (LDPE), more traditional linear low density polyethylene (LLDPE) typically made using Ziegler-Natta catalysis and metallocene or constrained geometry catalyzed polyethylene—some linear polyethylenes, but also some substantially linear polyethylene containing a slight amount of long chain branching. While these polymers have varying positives and negatives—depending on application or end-use—more control over the polymer structure is still desired.

Ethylene polymers are one of the commonly used polymers for crosslinking. It is known that certain properties of ethylene polymers, including properties, which can have an effect on the crosslinking efficiency, i.e. on crosslinking rate and degree, may vary inter alia depending on the type of polymerization process, such as high pressure polymerization or a low pressure polymerization process, process conditions, and especially in case low pressure polymerization, the catalyst used in the process.

For instance polyethylene has typically a characteristic molecular weight distribution (MWD=Mw/Mn), comonomer distribution, so-called long chain branching (LCB) and/or degree of unsaturation depending on the type of the catalyst, such as Ziegler Natta, Cr or single site catalyst, used in polymerization. Of these variable properties i.a. MWD, and degree of unsaturation (and their type) may have an effect on the crosslinking efficiency. Additionally a narrow MWD sacrifices the processing of the polymer.

Unsaturated structures in polyolefin polymers are important in many respects. The influence of different structural properties of various polyethylene types on the crosslinking-response has been investigated by a considerable number of authors in the last 50 years, partly leading to different conclusions.

These properties include the unsaturation degree, the type of unsaturation, the MFR, the degree of crystallinity and branching and the concentration of peroxide added, to name only the most important. The degree of unsaturation has a significant impact on the crosslinking degree, although it is not the only influencing factor that has to be taken into account. As a rule of thumb the higher the amount of double bonds in the uncrosslinked polyethylene is, the better crosslinking-performance can be expected. However, the type of unsaturation bounds is important as well, due to different accessibility of the various unsaturation bonds and different stability of the intermediate radicals.

Crosslinking can be achieved by different approaches. The three most important and widely used methods are crosslinking by a) peroxide treatment, b) silane treatment, c) using highly energetic radiation. All of these processes are more or less influenced by the differing structures and functional groups of the polymer. These include the degree and type of unsaturation, the degree and type of branching, the degree of crystallinity, the concentration and type of peroxide. The type and amount of these resulting structures in the virgin polyethylene resins are controlled by the production process and its conditions, the catalyst and the type and amount of comonomer and hydrogen introduced.

EP 2580279 discloses ethylene polymers having less than 12 total unsaturation unit/100,000 C, less than 2 vinylidene unsaturation unit/100,000 C, less than 2 trisubstituted unsaturation unit/100,000 C. These polymers are produced with post-metallocene catalysts, which allow controlling unsaturation levels in the polymer.

EP 885255 discloses to use ethylene polymers having less than 0.30 vinyl unsaturation/1000 carbon atoms for crosslinking. The polymers of the Inventive Examples have a MWD of max. 2.04.

EP 2256158 describes ethylene polymers produced with a Ziegler-Natta catalyst with carbon-carbon double bonds in an amount of more than 0.2 carbon-carbon double bonds/1000 carbon (i.e. more than 20/100,000C). The expression "amount of carbon-carbon double bonds" is defined as the total sum of vinyl-, vinylidene- and trans-vinylene–groups/1000 carbon atoms.

The amount of vinyl unsaturation shall be at least 0.19 vinyl groups/1000 C (at least 19/100,000C).

Although several ethylene polymers have been described in the prior art with specific unsaturation levels, which are also suitable for crosslinking, there is a continuous need in the polymer field to find improved polymer solutions having an improved property profile, e.g. having an improved balance of unsaturation levels, Mw/Mn and $MFR_{10}/MFR_2$ ratio.

There remains a need for unsaturated poly-alpha olefin materials particularly useful as intermediate materials for making functionalized poly-alpha olefins.

An object of the present invention is therefore to provide ethylene-1-octene copolymers having such an improved property profile.

It is in particular an object of the invention to provide ethylene-1-octene copolymers having an improved balance of unsaturation levels, Mw/Mn and $MFR_{10}/MFR_2$ ratio.

It is a further objected to provide ethylene-1-octene copolymers for use in crosslinking and/or grafting with comonomer units having hydrolysable silane groups.

A further object is to provide a solution polymerization process using specific catalyst systems for preparing such copolymers.

The invention thus provides an ethylene-1-octene copolymer characterized by a) a density in the range of 850 kg/m$^3$ to 930 kg/m$^3$ measured according to ISO 1183-187, b) a melt flow rate $MFR_2$ (190° C., 2.16 kg) in the range of from 0.3 g/10 min to 100 g/10 min measured according to ISO 1133, c) a $MFR_{10}/MFR_2$ of from 5.0 to 15.0, d) a Mw/Mn of from 2.0 to 5.0, e) 1.0 to below 20.0 vinyl unsaturation units/100,000 C atoms, f) more than 5.0 to 35.0 vinylidene unsaturation units/100,000 C atoms,
g) more than 5.0 to 30.0 vinylene unsaturation units/100,000 C atoms,
h) more than 15.0 to 60.0 trisubstituted unsaturation units/100,000 C atoms (all e) to h) measured with 1H NMR),
i) 26 to 150 total unsaturation units/100,000 C atoms, wherein the total unsaturation units/100,000 C atoms is the sum of vinyl unsaturation units/100,000 C atoms, vinylidene unsaturation units/100,000 C atoms, vinylene unsaturation units/100,000 C atoms and trisubstituted unsaturation units/100,000 C atoms, all measured by $^1$H NMR,
j) an unsaturation degree according to formula $$\text{unsaturation}_{Type}\text{ degree (\%)} = \frac{\text{unsaturation}_{Type}\text{ units}/100,000\text{ C atoms}}{\text{total unsaturation units}/100,000\text{ C atoms}} * 100$$

a vinyl unsaturation degree is in the range of from 5.0 to 15.0%,
a vinylene unsaturation degree is in the range of from 20.0 to 30.0%, and
k) wherein the sum of the vinyl unsaturation degree and vinylidene unsaturation degree is at least 30.0% up to 50.0%.

The ethylene 1-ocetene copolymer has several surprising advantages.

The inventive ethylene 1-ocetene copolymers show not only a high degree of unsaturation for different unsaturation types, but at the same time a high unsaturation degree over a range of average molecular weight Mw and/or a range of 1-octene comonomer content.

In the present application the different unsaturation types are vinyl unsaturation, vinylidene unsaturation, vinylene unsaturation and trisubstituted unsaturation. The vinylene unsaturation herein is the sum of trans vinylene and cis vinylene.

Without wishing to be bound by any theory, it is believed that a higher degree of unsaturation leads to better resistance to deformation of the polymer at low temperatures.

Furthermore, due to the high degree of unsaturation improved crosslinking efficiency can be expected.

Preferably, the total unsaturation units/100,000 C of the copolymer follows the inequation (I)

$$y > -0.0002A + 65.8 \tag{I}$$

wherein y is the total unsaturation/100 000 C atoms and A is the Mw of the copolymer in g/mol,
and/or the total unsaturation units/100,000 C of the copolymer follows the inequation (II)

$$y > 0.12B + 39.38 \tag{II}$$

wherein y is the total unsaturation/100 000 C atoms and B is the 1-octene content of the copolymer in wt. %.

More preferably, the total unsaturation units/100,000 C of the copolymer follows the inequation (I) and the total unsaturation units/100,000 C of the copolymer follows the inequation (II).

Preferably, the density is in the range of 855 kg/m$^3$to 920 kg/m$^3$, more preferably 855 kg/m$^3$ to 915 kg/m$^3$ measured according to ISO 1183-187.

Preferably, the ratio $MFR_{10}/MFR_2$ is in a range of from 6.0 to 13.0, more preferably 7.0 to 11.0.

Preferably, the Mw/Mn is in the range of from 2.4 to 4.0, more preferably of from 2.4 to 3.5.

Preferably, the melt flow rate $MFR_2$ (190° C., 2.16 kg) is in the range of from 0.8 g/10 min to 90 g/10 min, more preferably of from 0.9 to 50 g/10 min.

Preferably, the vinyl unsaturation units/100,000 C atoms are in the range of 5.0 to 19.0, and/or the vinylidene unsaturation units/100,000 C atoms are in the range of 13.0 to 32.0, and/or the vinylene unsaturation units/100,000 C atoms are in the range of 8.0 to 23.0, and/or the trisubstituted unsaturation units/100,000 C atoms are in the range of 22.0 to 51.0.

The total unsaturation units/100,000 C atoms is preferably 35 to 135, and more preferably 45 to 120.

Preferably, the vinyl unsaturation degree is in the range of from 7.0 to 17.0%.

Preferably, the vinylidene unsaturation degree is in the range of from 20.0 to 32.0%, more preferably in the range of from 22.0 to 28.0%.

Preferably, the vinylene unsaturation degree is in the range of from 14.0 to 28.0%.

Preferably, the trisubstituted unsaturation degree is in the range of from 35.0 to 50.0%, more preferably in the range of from 36.0 to 45.5%.

Preferably, the sum of the vinyl unsaturation degree and vinylidene unsaturation degree is at least 32.0% up to 46.0%.

The inventive copolymer is a copolymer of ethylene and 1-octene as comonomer. Preferably, the 1-octene is present in an amount of 10 to 45 wt. %, more preferably 12 to 43 wt. %, and most preferably 15 to 41 wt. %, based on the weight of the total copolymer.

The invention further provides a process for producing the ethylene-1-octene copolymer according to the invention.

The invention thus provides a process for preparing the ethylene-1-octene copolymer according to the invention in a continuous high temperature solution process at a temperature from 120° C. to 250° C. and a pressure of 50 to 300 bar, the process comprising at least the steps of:

(A) polymerizing in at least a first polymerization reactor in a first solvent, ethylene monomer and 1-octene comonomer in the presence of a first polymerization catalyst and optionally a chain transfer agent for producing a first solution comprising a first ethylene-1-octene copolymer and the first solvent;
whereby the first solvent, ethylene monomer and 1-octene comonomer are provided in a first feed stream; and
wherein the first polymerization reactor is operated under operating conditions which ensure that the reactor contents form a single homogenous phase,
(B) withdrawing a first stream of the first solution from the first polymerization reactor,
(C) separating the first ethylene-1-octene copolymer from the first stream of step (B), wherein the first polymerization catalyst comprises:

(i) at least one metallocene complex of formula (I)

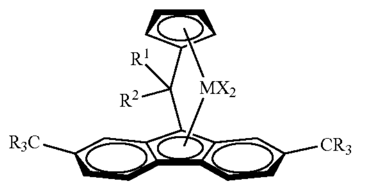

wherein

M is Hafnium,

R are the same or different from each other and can be a saturated linear or branched C1 to C10 alkyl, preferably all R are the same and are a linear or branched C1 to C3 alkyl, more preferably all R are a C1 alkyl group, $R^1$ is an unsubstituted C6 to C10 aryl, preferably phenyl and $R^2$ is a C4 to C20 cycloalkyl group or a C4 to C6 alkenyl groups, X is a C1 to C6 alkyl, preferably methyl, and (ii) a boron containing cocatalyst.

Preferably, the process according to the invention further comprising the steps of (D) polymerizing in a second polymerization reactor in a second solvent, ethylene monomer and 1-octene comonomer in the presence of a second polymerization catalyst and optionally a chain transfer agent for producing a second solution comprising a second ethylene-1-octene copolymer and the second solvent;

whereby the second solvent, ethylene monomer and 1-octene comonomer are provided in a second feed stream; and (E) withdrawing a second stream of the second solution from the second polymerization reactor, (F) separating the second ethylene-1-octene copolymer from the second stream, and (G) combining the first ethylene-1 -octene copolymer of step (C) with the second ethylene-1-octene copolymer of step (F), wherein the second polymerization catalyst comprises:

(i) at least one metallocene complex of formula (I)

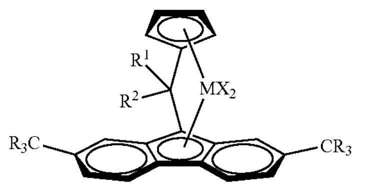

wherein

M is Hafnium,

R are the same or different from each other and can be a saturated linear or branched C1 to C10 alkyl, preferably all R are the same and are a linear or branched C1 to C3 alkyl, more preferably all R are a C1 alkyl group, $R^1$ is a unsubstituted C6 to C10 aryl, preferably phenyl and $R^2$ is a C4 to C20 cycloalkyl group or a C4 to C6 alkenyl groups, X is a C1 to C6 alkyl, preferably methyl, and (ii) a boron containing cocatalyst, and wherein the first polymerization catalyst and the second polymerization catalyst can be the same or different from each other.

In case a first polymerization reactor and a second polymerization reactor are used in the process according to the invention, the first polymerization reactor and the second polymerization reactor are operated in parallel configuration for preparing the copolymer according to the invention.

The temperature in the polymerization reactor(s), i.e. in the first polymerization reactor and in the second polymerization reactor, is such that the copolymer formed in the polymerization reaction is completely dissolved in the reaction mixture comprising the solvent, the comonomer, the optional chain transfer agent and the copolymer.

The temperature is suitably greater than the melting temperature of the copolymer of the invention. Thus, the temperature is suitably from 120° C. to 220° C., such as from 150° C. to 200° C., depending on the content of comonomer units in the copolymer.

The pressure in the polymerization reactor(s), i.e. in the first polymerization reactor and in the optional second polymerization reactor, depends on the temperature, on one hand, and the type and the amount of the hydrocarbons, i.e. comonomer, monomer and solvent, on the other hand. The pressure in the first polymerization reactor and in the optional second polymerization reactor is suitably from 50 to 300 bar, preferably from 50 to 250 bar and more preferably from 70 to 200 bar.

The first polymerization reactor and the optional second polymerization reactor are operated under operating conditions, such as temperature and pressure, which ensure that the reactor contents of each polymerization reactor form a single homogenous phase, the reactor contents comprising the ethylene monomer, the 1-octene comonomer, the solvent, the optional chain transfer agent, and the copolymer product.

The first polymerization reactor and the optional second polymerization reactor are preferably selected from the group of tubular reactor, stirred autoclave, tank reactor, loop reactor, or combinations thereof.

The residence time is short, typically less than 15 minutes.

The process is operated continuously. Thereby, feed streams of monomer, comonomer, catalyst and solvent, and optional chain transfer agent are continuously passed to the polymerization reactor (s), i.e. to the first polymerization reactor and to the optional second polymerization reactor.

A first solvent and preferably a second solvent are present in the polymerization process. The first solvent and the second solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. Preferably, the first solvent and the second solvent comprise, or consist of, n-hexane.

The first and second solvent must be inert towards the polymerization catalyst(s) and the monomers. Further, it should be stable in the polymerization conditions. It further must be able to dissolve the ethylene monomer, the 1-octene comonomer, the optional chain transfer agent and the copolymer in the polymerization conditions.

A chain transfer agent may be used in one or both of the polymerization reactors for controlling the molecular weight of the copolymer as it is known in the art. A suitable chain transfer agent is, for instance, hydrogen. By maintaining different concentrations of the chain transfer agent in the two reactors it is possible to produce a copolymer blend having a broadened molecular weight distribution.

Preferably, the first stream of the first solution of step (B) is passed from the first polymerisation reactor to a first heating step (B1) before conducting step (C) and/or the second stream of the second solution of step (E) is passed from the second polymerisation reactor to a second heating step (E1) before conducting step (F), more preferably the first stream of the first solution of step (B) is passed from the first polymerisation reactor to a first heating step (B1) before conducting step (C) and the second stream of the second solution of step (E) is passed from the second polymerisation reactor to a second heating step (E1) before conducting step (F). The purpose of the first heating step (B1) and/or second heating step (E1) is to preheat the first and/or second stream before they enter the first separation step (C) and/or second separation step (F), respectively.

The first heating step (B1) is suitably conducted in a first heat exchanger, and the second heating step (E1) is suitably conducted in a second heat exchanger.

For instance, the first stream of the first solution is distributed in a number of tubes of the first heat exchanger and a heating fluid is passed to contact the tubes thereby heating the solution flowing therein, and/or the second stream of the second solution is distributed in a number of tubes of the second heat exchanger and a heating fluid is passed to contact the tubes thereby heating the solution flowing therein.

The purpose of both the first and second heating step is to recover the heat from the process streams thereby improving the economy of the process.

The heating fluid may be any process fluid which contains recoverable heat. Preferably the vapour stream recovered from the separation steps (C) and/or (F) is used as the heating fluid. During the process the heating fluid, e.g. the vapour stream, is cooled. It is preferred to withdraw so much heat form the vapour stream that at least a part of the vapour stream condenses in the heating step. Typically the temperature of the first stream of the first solution and/or the second stream of the second solution, before entering the first and/or second heating step, respectively, is from 120° C. to 240° C., preferably from 140° C. to 220° C., most preferably from 150° C. to 200° C.

Preferably, the temperature of the stream immediately downstream of the first and/or second heating step is from 160° C. to 240° C., more preferably from 170° C. to 220° C., most preferably from 180° C. to 200° C. The temperature of the heating fluid, like the vapour stream, prior to entering the heating step is preferably from 120° C. to 240° C.

It is preferred that the pressure of the first stream of the first solution and/or the second stream of the second solution is not substantially affected by the first and/or second heating step, respectively. The pressure is suitably from 50 to 300 bar, preferably from 60 to 250 bar and more preferably from 70 to 200 bar.

The first stream of step (B), or preferably of step (B1), is passed to the separation step (C) where the temperature and pressure are adjusted such that a liquid phase and a vapour phase are obtained. Likewise, the second stream of step (E), or preferably of step (E1), is passed to the separation step (F) where the temperature and pressure are adjusted such that a liquid phase and a vapour phase are obtained.

The ethylene-1-octene copolymer is dissolved in the liquid phase which comprises a part of the eventual solvent and a part of the eventual unreacted comonomer while most part of the unreacted monomer, eventual unreacted chain transfer agent, eventually a part of the unreacted comonomer, and eventually, a part of the solvent form the vapour phase. The temperature in the separation step (C) and the separation step (F) is suitably within the range of from 120° C. to 240° C., preferably from 140° C. to 220° C. and more preferably from 150° C. to 200° C. The pressure in the separation step (C) and the separation step (F) is from 1 to 15 bar, preferably from 2 to 12 bar and more preferably from 5 to 10 bar. The conditions in the separation step (C) and the separation step (F) should be as such that no unwanted polymerization downstream the reactors can occur which would necessitate killing of the polymerization catalysts usually with polar substances.

In another aspect of the present invention, which, however, is not preferred, catalyst killing agent is added to the first and/or second stream before or during the separation steps (C) and/or (F), respectively. The catalyst killing agent is usually a polar component such as water, alcohols (such as methanol and ethanol), sodium/calcium stearate, CO, and combinations thereof. As discussed above, the conditions in the separation steps (C) and (F) need to be such that the vapour phase and the liquid phase are formed. Thereby the recycle of the reactants to the reactors can be maintained as simple as possible.

The separation step (C) and the separation step (F) may be conducted according to any separation method known in the art where a liquid phase and a vapour phase coexist. It is preferred to conduct both the separation step (C) and the separation step (F) as a flashing step, because of the easiness of operation. As it is well known in the art the liquid feed is passed to a vessel operated at a reduced pressure. Thereby a part of the liquid phase vaporises and can be withdrawn as an overhead stream (or a vapour stream) from the flash. The part remaining in liquid phase is then withdrawn as a bottom stream (or a liquid stream).

The advantage of having a vapour phase and a liquid phase present in the separation step is for the first a simple apparatus and thus low investment cost. In addition, the carry-over of polymer with the vapour stream is minimal.

The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 120 to 240° C. The temperature should be sufficiently high to keep the viscosity of the solution at a suitable level but less than the temperature where the polymer is degraded. The pressure in the flash vessel is typically from 15 bar to atmospheric, or even less than atmospheric.

In an alternative embodiment of the process of the invention, a first stream of the first solution is withdrawn from the first polymerisation reactor and a second stream of the second solution is withdrawn from the second polymerization reactor, the first stream being combined with the second stream to form a combined stream, and the ethylene-1-octene copolymer being separated from the combined stream. All embodiments of the process of the invention as described above are also preferred embodiments of the alternative embodiment of the process of the invention, if applicable.

Preferably, a comonomer reactivity according to formula (II)

$$\text{Comonomer Reactivity} = (C8/C2)_{polymer}/(C8/C2)_{feed} \quad \text{(II)}$$

is >0.28 up to 0.65, preferably 0.30 to 0.60 and more preferably 0.32 to 0.58, wherein in the formula (II)

$(C8/C2)_{polymer}$ is the ratio of wt. % of 1-octene/wt. % of ethylene in the copolymer and $(C8/C2)_{feed}$ is the ratio of wt. % of 1-octene/wt. % of ethylene in the first feed stream, or in the sum of first feed stream and the second feed stream.

Polymerization Catalyst

The process according to the invention comprises a first polymerization catalyst and preferably a second polymerization catalyst. The first polymerization catalyst can be the same or different from the second polymerization catalyst.

The first polymerization catalyst and the second polymerization catalyst can be the same or different from each other and comprise (i) at least one metallocene complex of formula (I), and (ii) boron containing cocatalyst (ii).

The at least one metallocene complex of formula (I) is

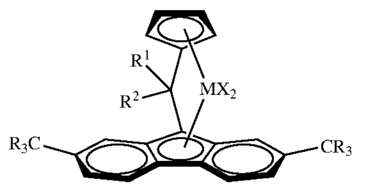

wherein

M is Hafnium,

R are the same or different from each other and can be a saturated linear or branched C1-C10-alkyl, preferably all R are the same and are a linear or branched C1 to C3 alkyl, more preferably all R are a C1-alkyl group, $R^1$ is a unsubstituted C6-C10 aryl, preferably phenyl and $R^2$ is a C4-C20 cycloalkyl group or a C4 to C6-alkenyl groups, X is a C1 to C6 alkyl, preferably methyl.

Preferably, the at least one metallocene complex of formula (I) is a metallocene complex of formula (Ia)

(Ia)

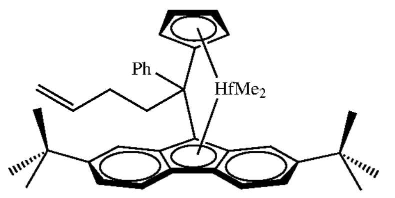

((Phenyl)(3-buten-1-yl)methylene(cyclopentadienyl)(2,7-di-tert-butylfluoren-9-yl) hafnium dimethyl), and/or a metallocene complex of formula (Ib)

(Ib)

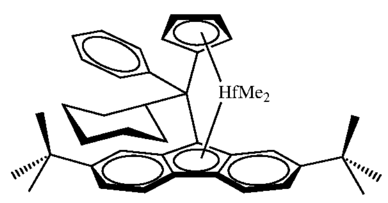

(Phenyl)(cyclohexyl)methylene(cyclopentadienyl)(2,7-di-tert-butylfluoren-9-yl)hafnium dimethyl).

The preparation of these metallocene complexes of formula (I), including the metallocene catalysts if formulae (Ia) and (Ib), is found in WO2018/108918 and WO2018/178152.

Cocatalyst

To form an active catalytic species it is normally necessary to employ a cocatalyst as is well known in the art. The process for preparing ethylene-1-octene copolymers according to the invention uses a boron containing cocatalyst (ii).

Boron based cocatalysts include boron compounds containing a borate $3^+$ ion, i.e. borate compounds. These compounds generally contain an anion of formula (III):

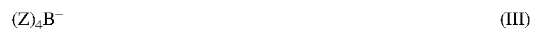

$$(Z)_4B^- \quad \text{(III)}$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a non-coordinating anion such as tetrakis(pentafluorophenyl)borate.

Suitable counterions are protonated amine or aniline derivatives, carbenium ions or phosphonium ions. These may have the general formula (IV), (V) or (VI):

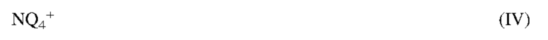

$$NQ_4^+ \quad \text{(IV)}$$

or

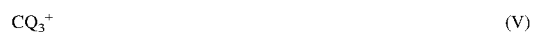

$$CQ_3^+ \quad \text{(V)}$$

or

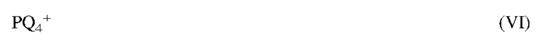

$$PQ_4^+ \quad \text{(VI)}$$

where Q is independently H, $C_{1-6}$-alkyl, $C_{3-8}$-cycloalkyl, phenyl-$C_{1-6}$-alkylene- or optionally substituted phenyl (Ph). Optional substituents may be $C_{1-6}$-alkyl, halo or nitro. There may be one or more than one such substituent. Preferred substituted Ph groups include therefore para-substituted phenyl, preferably tolyl or dimethylphenyl.

If it is necessary that at least one Q group in (IV) and (VI) is H, then preferred compounds are those of formula:

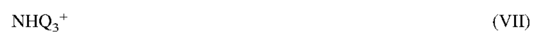

$$NHQ_3^+ \quad \text{(VII)}$$

or

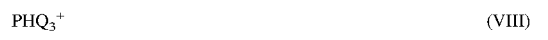

$$PHQ_3^+ \quad \text{(VIII)}$$

Preferred phenyl-$C_{1-6}$-alkyl- groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

As carbenium ion especially triphenylmethylcarbenium ("trityl") or tritolylcarbenium is used.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh3^+$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include tributylammoniumtetra(pentafluorophenyl)borate, tributylammoniumtetra(trifluoromethylphenyl)borate, tributylammoniumtetra-(4-fluorophenyl)borate, N,N-dimethylcyclohexylammoniumtetrakis-(pentafluorophenyl)borate, N,N-imethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakis(pentafluorophenyl) borate, and triphenylcarbeniumtetrakis(pentafluorophenyl) borate.

More preferred borates are triphenylcarbeniumtetrakis (pentafluorophenyl) borate, N,N-dimethylcyclohexylammoniumtetrakis(pentafluorophenyl)borate, N,N-dimethylbenzylammoniumtetrakis(pentafluorophenyl)borate or N,N-dimethylaniliniumtetrakis(pentafluorophenyl)borate.

Even more preferred borates are triphenylcarbeniumtetrakis(pentafluorophenyl) borate and N,N-dimethylaniliniumtetrakis(pentafluorophenyl)borate. N,N-dimethylaniliniumtetrakis(pentafluorophenyl)borate is most preferred.

Suitable amounts of cocatalyst will be well known to the skilled man.

Preferably, the molar ratio of boron of the boron containing cocatalyst (ii) to the metal ion (M) of the at least one metallocene complex of formula (I) is in the range 0.5:1 to 10:1 mol/mol, more preferably 1:1 to 10:1, especially 1:1 to 5:1 mol/mol.

Even more preferred is a molar ratio of boron of the boron containing cocatalyst (ii) to the metal ion (M) of the at least one metallocene complex of formula (I) of from 1:1 to less than 2:1 mol/mol, e.g. from 1:1 to 1.8:1 or 1:1 to 1.5:1.

The invention further provides an ethylene-1-octene copolymer obtained by the process according to the invention.

The present invention further provides the use of an ethylene-1-octene according to the invention for grafting with comonomer units comprising hydrolysable silane groups. By grafting the ethylene-1-octene according to the invention with comonomer units comprising hydrolysable silane groups a grafted ethylene-1-octene comprising hydrolysable silane groups is obtained.

The inventive copolymer can be grafted with comonomer units comprising hydrolysable silane groups. Grafting is preferably effected by radical reaction, e.g. in the presence of a radical forming agent, such as peroxide.

The comonomer units comprising hydrolysable silane groups are preferably an unsaturated silane compound of formula (A)

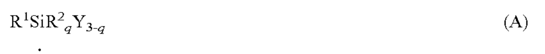

$$R^1SiR^2_qY_{3-q} \quad (A)$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y, which may be the same or different, is a hydrolysable organic group and q is 0, 1 or 2.

Special examples of the unsaturated silane compounds are those wherein R1 is vinyl, allyl, isopropenyl, butenyl, cyclohexanyl or gamma-(meth)acryloxy propyl; Y is methoxy, ethoxy, formyloxy, acetoxy, propionyloxy or an alkyl or arylamino group; and R2, if present, is a methyl, ethyl, propyl, decyl or phenyl group.

Further suitable silane compounds or, preferably comonomers are e.g. gamma-(meth)acryloxypropyl trimethoxysilane, gamma-(meth)acryloxypropyl triethoxysilane, and vinyl triacetoxysilane, or combinations of two or more thereof.

As a preferable subgroup unit of formula (A) is an unsaturated silane compound or, preferably, comonomer of formula (B)

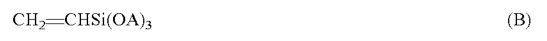

$$CH_2{=}CHSi(OA)_3 \quad (B)$$

wherein each A is independently a hydrocarbyl group having 1-8 carbon atoms, preferably 1-4 carbon atoms.

Preferred comonomers/compounds of the formula (B) are vinyl trimethoxysilane, vinyl bismethoxyethoxysilane, vinyl triethoxysilane, vinyl trimethoxysilane being the most preferred.

Preferably, the grafted ethylene-1-octene comprising hydrolysable silane groups is crosslinked.

The hydrolysable silane groups can be crosslinked by hydrolysis and subsequent condensation in the presence of a silanol condensation catalyst and $H_2O$ in a manner known in the art. Silane crosslinking techniques are known and described e.g. in U.S. Pat. Nos. 4,413,066, 4,297,310, 4,351,876, 4,397,981, 4,446,283 and 4,456,704.

For crosslinking of polyolefins containing hydrolysable silane groups, a silanol condensation catalyst must be used. Conventional catalysts are, for example, tin-, zinc-, iron-, lead- or cobalt-organic compounds such as dibutyl tin dilaurate (DBTDL).

Preferably, the ethylene-1-octene according to the invention is crosslinked. Preferably, crosslinking is performed by irradiation crosslinking or by peroxide crosslinking, more preferably by peroxide crosslinking. Both irradiation crosslinking and peroxide crosslinking of ethylene copolymers is known in the art. In radiation crosslinking, the crosslinking takes place by the copolymer being irradiated with high-energy radiation, such as electron radiation, while in peroxide crosslinking the crosslinking takes place by the addition of peroxide compounds, such as dicumylperoxide or di(tert-butyl)peroxide, which form free radicals.

EXAMPLES

1. Measurement Methods a) Melt Flow Rate (MFR) and Flow Rate Ratio (FRR)

The melt flow rate (MFR) is determined according to ISO1133—Determination of the melt mass-flow rate (MFR) and melt volume-flow rate (MVR) of thermoplastics—Part 1: Standard method, and is indicated in g/10min. The MFR is an indication of flowability, and hence processability, of the polymer. The higher the melt flow rate, the lower the viscosity of the polymer.

The $MFR_2$ of polyethylene is determined at a temperature of 190° C. and a load of 2.16 kg.

The $MFR_{10}$ of polyethylene is determined at a temperature of 190° C. and a load of 10 kg.

The flow rate ratio (FRR) is the $MFR_{10}/MFR_2$.

b) Density

The density of the polymer was measured according to ISO1183-187.

c) Cornonomer Content

Quantitative nuclear-magnetic resonance (NMR) spectroscopy was used to quantify the comonomer content of the polymers.

Quantitative $^{13}C\{^{1}H\}$ NMR spectra recorded in the molten-state using a Bruker Avance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the transient NOE at short recycle delays of 3 s and the RS-HEPT decoupling scheme. A total of 1024 (1 k) transients were acquired per spectrum.

Quantitative $^{13}C\{^{1}H\}$ NMR spectra were processed, integrated and quantitative properties determined using custom spectral analysis automation programs. All chemical shifts are internally referenced to the bulk methylene signal (d+) at 30.00 ppm.

Characteristic signals corresponding to the incorporation of 1-octene were observed and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.3 ppm. This integral is assigned to the unresolved signals corresponding to both *B6 and *bB6B6 sites of isolated (EEOEE) and isolated double non-consecutive (EEOEOEE) 1-octene sequences respectively. To compensate for the influence of the two *bB6B6 sites the integral of the bbB6B6 site at 24.6 ppm is used:

$$O = I_{*B6+*bB6B6} - 2*I_{bbB6B6}$$

Characteristic signals resulting from consecutive 1-octene incorporation, i.e. EEOOEE comonomer sequences, were also observed. Such consecutive 1-octene incorporation was quantified using the integral of the signal at 40.4 ppm assigned to the aaB6B6 sites accounting for the number of reporting sites per comonomer:

$$OO = 2*I_{aaB6B6}$$

Characteristic signals resulting from isolated non-consecutive 1-octene incorporation, i.e. EEOEOEE comonomer sequences, were also observed. Such isolated non-consecutive 1 -octene incorporation was quantified using the integral of the signal at 24.6 ppm assigned to the bbB6B6 sites accounting for the number of reporting sites per comonomer:

$$OEO = 2*I_{bbB6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the aagB6B6B6 sites accounting for the number of reporting sites per comonomer:

$$OOO = 3/2*I_{aagB6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EE000EE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.9 and 32.23 ppm. The 22.84 ppm integral is assigned to the unresolved signals corresponding to both 2B6 and 2S sites of 1-octene and the saturated chain end respectively. The 32.2 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*O_{total})$$

The ethylene comonomer content was quantified using the integral of the bulk methylene (bulk) signals at 30.00 ppm. This integral included the g and 4B6 sites from 1-octene as well as the d+sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 0*OOO + 3*S]$$

It should be noted that compensation of the bulk integral for the presence of isolated triple-incorporation (EE-OOOEE) 1-octene sequences is not required as the number of under and over accounted ethylene units is equal.

The total mole fraction of 1-octene in the polymer was then calculated as:

$$fO = O_{total}/(E_{total} + O_{total})$$

The total comonomer incorporation of 1-octene in weight percent was calculated from the mole fraction in the standard manner:

$$O\,[\text{wt }\%] = 100*(fO*112.21)/((fO*112.21) + ((1 - fO)*28.05))$$

Further information can be found in the following references:

Klimke, K., Parkinson, M., Piel, C., Kaminsky, W., Spiess, H. W., Wilhelm, M., Macromol. Chem. Phys. 2006; 207:382.

Parkinson, M., Klimke, K., Spiess, H. W., Wilhelm, M., Macromol. Chem. Phys. 2007; 208:2128

NMR Spectroscopy of Polymers: Innovative Strategies for Complex Macromolecules, Chapter 24, 401 (2011)

Pollard, M., Klimke, K., Graf, R., Spiess, H. W., Wilhelm, M., Sperber, O., Piel, C., Kaminsky, W., Macromolecules 2004; 37:813.

Filip, X., Tripon, C., Filip, C., J. Mag. Resn. 2005, 176, 239

Griffin, J. M., Tripon, C., Samoson, A., Filip, C., and Brown, S. P., Mag. Res. in Chem. 2007 45, S1, S198

Castignolles, P., Graf, R., Parkinson, M., Wilhelm, M., Gaborieau, M., Polymer 50 (2009) 2373

Zhou, Z., Kuemmerle, R., Qiu, X., Redwine, D., Cong, R., Taha, A., Baugh, D. Winniford, B., J. Mag. Reson. 187 (2007) 225

Busico, V., Carbonniere, P., Cipullo, R., Pellecchia, R., Severn, J., Talarico, G., Macromol. Rapid Commun. 2007, 28, 1128

J. Randall, Macromol. Sci., Rev. Macromol. Chem. Phys. 1989, C29, 201

Qiu, X., Redwine, D., Gobbi, G., Nuamthanom, A., Rinaldi, P., Macromolecules 2007, 40, 6879

Liu, W., Rinaldi, P., McIntosh, L., Quirk, P., Macromolecules 2001, 34, 4757 d) Unsaturation

Quantitative nuclear-magnetic resonance (NMR) spectroscopy was used to quantify the content of unsaturated groups present in the polymers.

Quantitative $^1H$ NMR spectra recorded in the solution-state using a Bruker Avance III 400 NMR spectrometer operating at 400.15 MHz. All spectra were recorded using a $^{13}C$ optimised 10 mm selective excitation probehead at 125° C. using nitrogen gas for all pneumatics. Approximately 200 mg of material was dissolved in 1,2-tetrachloroethane-$d_2$ (TCE-$d_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. All chemical shifts were indirectly referenced to TMS at 0.00 ppm using the signal resulting from the residual protonated solvent at 5.95 ppm.

Characteristic signals corresponding to the presence of terminal aliphatic vinyl groups ($R—CH{=}CH_2$) were observed and the amount quantified using the integral of the two coupled inequivalent terminal $CH_2$ protons (Va and Vb) at 4.95, 4.98 and 5.00 and 5.05 ppm accounting for the number of reporting sites per functional group:

$$Nvinyl = IVab/2$$

When characteristic signals corresponding to the presence of internal vinylidene groups ($RR'C{=}CH_2$) were observed the amount is quantified using the integral of the two $CH_2$ protons (D) at 4.74 ppm accounting for the number of reporting sites per functional group:

$$Nvinylidene = ID/2$$

When characteristic signals corresponding to the presence of internal cis-vinylene groups (E-RCH=CHR'), or related structure, were observed the amount is quantified using the integral of the two CH protons (C) at 5.39 ppm accounting for the number of reporting sites per functional group:

$$Ncis = IC/2$$

When characteristic signals corresponding to the presence of internal trans-vinylene groups (Z-RCH=CHR') were observed the amount is quantified using the integral of the two CH protons (T) at 5.45 ppm accounting for the number of reporting sites per functional group:

$$Ntrans = IT/2$$

When characteristic signals corresponding to the presence of internal trisubstituted-vinylene groups (RCH=CHR'R"), or related structure, were observed the amount is quantified using the integral of the CH proton (Tris) at 5.14 ppm accounting for the number of reporting sites per functional group:

$$Ntris = ITris$$

The Hostanox 03 stabiliser was quantified using the integral of multiplet from the aromatic protons (A) at 6.92, 6.91, 6.69 and at 6.89 ppm and accounting for the number of reporting sites per molecule:

$$H = IA/4$$

As is typical for unsaturation quantification in polyolefins the amount of unsaturation was determined with respect to total carbon atoms, even though quantified by $^1H$ NMR spectroscopy. This allows direct comparison to other microstructure quantities derived directly from $^{13}C$ NMR spectroscopy.

The total amount of carbon atoms was calculated from integral of the bulk aliphatic signal between 2.85 and −1.00 ppm with compensation for the methyl signals from the stabiliser and carbon atoms relating to unsaturated functionality not included by this region:

$$NCtotal = (Ibulk - 42 * H)/2 + 2 * Nvinyl + 2 * Nvinylidene + 2 * Ncis + 2 * Ntrans + 2 * Ntris$$

The content of unsaturated groups (U) was calculated as the number of unsaturated groups in the polymer per thousand total carbons (kCHn):

$$U = 1000 * N/NCtotal$$

The total amount of unsaturated group was calculated as the sum of the individual observed unsaturated groups and thus also reported with respect per thousand total carbons:

$$Utotal = Uvinyl + Uvinylidene + Ucis + Utrans + Utris$$

The relative content of a specific unsaturated group (U) is reported as the fraction or percentage of a given unsaturated group with respect to the total amount of unsaturated groups:

$$[U] = Ux/Utotal$$

Further information can be found in the following references:

He, Y., Qiu, X, and Zhou, Z., Mag. Res. Chem. 2010, 48, 537-542.

Busico, V. et. al. Macromolecules, 2005, 38 (16), 6988-6996 e) Determination of the Molecular Weight Averages, Molecular Weight Distribution Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with a multiple band infrared detector model IR5 (PolymerChar, Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. at a constant flow rate of 1 mL/min. 200 μL of sample solution was injected per analysis. Data collection was performed by using PolymerChar GPC-one software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyethylene molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

A third order polynomial fit was used to fit the calibration data.

All samples were prepared in the concentration range of 0.5 to 1 mg/ml and dissolved at 160° C. for 3 hours under continuous gentle shaking.

2. Polymerization Catalysts

Catalyst A is (Phenyl)(cyclohexyl)methylene(cyclopentadienyl)(2,7-di-tert-butylfluoren-9-yl)hafnium dimethyl), produced according to WO2018/108918.

Catalyst B is (Phenyl)(3-buten-1-yl)methylene(cyclopentadienyl) (2,7-di-tert-butylfluoren-9-yl) hafnium dimethyl), produced according to WO2018/178152.

As cocatalyst N,N-Dimethylanilinium Tetrakis(pentafluorophenyl)borate (AB) (CAS 118612-00-3) was used, commercially available from Boulder.

3. Polymerization of ethylene-1-octene copolymers

Polymerization was done with Borealis proprietor Borceed™ solution polymerization technology, in the presence of metallocene catalyst (phenyl)(cyclohexyl) methylene (cyclopentadienyl) (2,7-di-tert-butylfluorenyl) hafnium dimethyl (Catalyst A) or (Phenyl)(3-buten-1-yl)methylene(cyclopentadienyl) (2,7-di-tert-butylfluoren-9-yl) hafnium dimethyl) (Catalyst B) and N,N-Dimethylanilinium Tetrakis (pentafluorophenyl)borate (AB) (CAS 118612-00-3) as cocatalyst.

The polymerization conditions were selected in such a way that the reacting system is one liquid phase (temperature T between 120 and 220° C.; pressure between 50 to 300 bar).

Inventive examples IE1 to IE9 were produced using Catalyst A.

Inventive examples IE10 to IE12 were produced using Catalyst B.

Comparative example CE1 is Engage 8540 (commercially available from Dow), CE2 is Exact 9361 (commercially available from Exxon), CE3 is Engage 7467 (commercially available from Dow), and CE4 is LC170 (commercially available from LG Chem).

4. Results

The results are given below.

TABLE 1

Process conditions and reactivity

| Example | T, ° C. | C8/C2 Feed | C8/C2 Polymer | C8 reactivity |
|---|---|---|---|---|
| IE1 | 150.9 | 1.72 | 0.61 | 0.36 |
| IE2 | 159.5 | 1.47 | 0.52 | 0.35 |
| IE3 | 181 | 0.45 | 0.18 | 0.41 |
| IE4 | 185 | 0.41 | 0.20 | 0.48 |
| IE5 | 191 | 0.38 | 0.20 | 0.52 |
| IE6 | 162 | 1.01 | 0.35 | 0.35 |

TABLE 2

Properties of Inventive Examples IE1 to IE12 and CE1 to CE4

| Example | octene, wt. % | Density, kg $m^{-3}$ | MFR2, g/10 min | MFR10/ MFR2 | Mw/Mn |
|---|---|---|---|---|---|
| IE1 | 39.1 | 860.3 | 0.9 | 8.8 | 2.8 |
| IE2 | 33.8 | 869.0 | 1.4 | 8.5 | 2.7 |
| IE3 | 16.1 | 902.3 | 0.9 | 10.2 | 2.7 |
| IE4 | 16.4 | 902.3 | 2.4 | 9.4 | 2.9 |
| IE5 | 16.7 | 902.9 | 9.7 | 8.8 | 3.1 |
| IE6 | 26.8 | 882.8 | 0.8 | 9.4 | 2.8 |
| IE7 | 17.02 | 901.9 | 29.7 | 7.2 | 2.54 |
| IE8 | 26.90 | 881.7 | 23.4 | 7.3 | 2.46 |
| IE9 | 31.65 | 870.6 | 6.6 | 7.9 | 2.54 |
| IE10 | 16.93 | 900.9 | 10.2 | 8.0 | 2.62 |
| IE11 | 25.46 | 884.1 | 29.60 | 7.3 | 2.52 |
| IE12 | 32.56 | 869.9 | 10.8 | 7.5 | 2.45 |
| CE1 | 13.4 | 902.0 | 1.0 | 9.4 | 2.2 |
| CE2 | 27.3 | 864.0 | 3.4 | 7.4 | 1.9 |
| CE3 | 30.6 | 862.0 | 1.2 | 7.4 | 2.7 |
| CE4 | 34.1 | 868.8 | 1.1 | 8.8 | 2.7 |

TABLE 3

Unsaturation types of Inventive Examples IE1 to IE12 and CE1 to CE4

| Example | Total unsaturation units/ 100k C | Vinylidene units/ 100k C | Vinyl units/ 100k C | Trisub-stituted units/ 100k C | Vinylene units/ 100k C |
|---|---|---|---|---|---|
| IE1 | 52.6 | 14.5 | 5.4 | 23.7 | 9.0 |
| IE2 | 63.7 | 16.2 | 6.1 | 29.3 | 12.3 |
| IE3 | 65.6 | 15.6 | 6.7 | 25.4 | 17.8 |
| IE4 | 72.4 | 18.5 | 7.9 | 28.3 | 17.8 |
| IE5 | 85.6 | 22.8 | 9.2 | 31.7 | 21.8 |
| IE6 | 63.2 | 15.4 | 6.3 | 27.0 | 14.4 |
| IE7 | 73.6 | 22.7 | 10.6 | 26.0 | 14.3 |
| IE8 | 104.9 | 29.9 | 14.9 | 40.4 | 19.6 |
| IE9 | 81.3 | 23.0 | 13.2 | 34.4 | 10.7 |
| IE10 | 85.4 | 21.0 | 10.1 | 34.9 | 19.4 |
| IE11 | 118.2 | 31.4 | 16.2 | 49.4 | 21.2 |
| IE12 | 105.4 | 26.9 | 18.7 | 43.8 | 16.0 |
| CE1 | 30.4 | 10.2 | 3.1 | 6.8 | 10.3 |
| CE2 | 37.9 | 14.6 | 1.7 | 4.0 | 17.6 |
| CE3 | 5.2 | 2.0 | 0.0 | 0.0 | 3.2 |
| CE4 | 29.8 | 2.4 | 3.0 | 7.8 | 16.6 |

TABLE 4

Unsaturation levels of Inventive Examples IE1 to IE12 and CE1 to CE4

| Example | Vinylidene, % | Vinyl, % | Trisub-stituted, % | Vinylene, % | Vinylidene + vinyl, % |
|---|---|---|---|---|---|
| IE1 | 27.6 | 10.3 | 45.1 | 17.1 | 37.9 |
| IE2 | 25.4 | 9.6 | 46.0 | 19.3 | 34.9 |
| IE3 | 23.8 | 10.2 | 38.7 | 27.1 | 34.0 |
| IE4 | 25.6 | 10.9 | 39.1 | 24.6 | 36.5 |
| IE5 | 26.6 | 10.7 | 37.0 | 25.5 | 37.4 |
| IE6 | 24.4 | 10.0 | 42.7 | 22.8 | 34.3 |
| IE7 | 30.8 | 14.4 | 35.3 | 19.4 | 45.2 |
| IE8 | 28.5 | 14.2 | 38.5 | 18.7 | 42.7 |
| IE9 | 28.3 | 16.2 | 42.3 | 13.2 | 44.5 |
| IE10 | 24.6 | 11.8 | 40.9 | 22.7 | 36.4 |
| IE11 | 26.6 | 13.7 | 41.8 | 17.9 | 40.3 |
| IE12 | 25.5 | 17.7 | 41.6 | 15.2 | 43.3 |
| CE1 | 33.5 | 10.2 | 22.4 | 33.9 | 43.7 |
| CE2 | 38.5 | 4.5 | 10.5 | 46.4 | 43.0 |
| CE3 | 38.5 | 0.0 | 0.0 | 61.5 | 38.5 |
| CE4 | 8.0 | 10.1 | 26.2 | 55.7 | 18.1 |

As can be seen from the tables above, the inventive copolymers show improved unsaturation levels, Mw/Mn and MFR10/MFR2 ratio.

The invention claimed is:

1. An ethylene-1-octene copolymer, wherein the ethylene-1-octene copolymer has a) a density in the range of 850 kg/$m^3$ to 930 kg/$m^3$ measured according to ISO 1183-187, b) a melt flow rate $MFR_2$ (190° C., 2.16 kg) in a range of from 0.8 g/10 min to 100 g/10 min measured according to ISO 1133, c) a $MFR_{10}/MFR_2$ of from 5.0 to 15.0 measured according to ISO 1133, d) a Mw/Mn of from 2.0 to 5.0 determined by gel permeation chromatography, e) 1.0 to 20.0 vinyl unsaturation units/100,000 C atoms measured by $^1$H NMR spectroscopy, f) 5.0 to 35.0 vinylidene unsaturation units/100,000 C atoms measured bylH NMR spectroscopy, g) 5.0 to 30.0 vinylene unsaturation units/100,000 C atoms measured bylH NMR spectroscopy, h) 15.0 to 60.0 trisubstituted unsaturation units/100,000 C atoms measured by$^1$H NMR spectroscopy, i) 26 to 150 total unsaturation units/100,000 C atoms, wherein the total unsaturation units/100,000 C atoms is a sum of vinyl unsaturation units/100,000 C atoms, vinylidene unsaturation units/100,000 C atoms, vinylene unsaturation units/100,000 C atoms and tri-substituted unsaturation units/100,000 C atoms, all measured bylH NMR spectroscopy, j) an unsaturation degree according to formula $$\text{unsaturation}_{Type}\text{ degree (\%)} = \frac{\text{unsaturation}_{Type}\text{ units}/100,000\text{ C atoms}}{\text{total unsaturation units}/100,000\text{ C atoms}} * 100$$

wherein a vinyl unsaturation degree is in a range of from 5.0 to 20%, a vinylene unsaturation degree is in a range of from 12.0 to 30.0%, and k) wherein a sum of the vinyl unsaturation degree and vinylidene unsaturation degree is 30.0% to 50.0%.

2. The ethylene-1-octene copolymer according to claim 1, wherein the total unsaturation units/100,000 C of the copolymer follows the inequality (I)

$$y > -0.0002A + 65.8 \quad (I)$$

wherein y is the total unsaturation/100 000 C atoms and A is the Mw of the copolymer in g/mol, and/or the total unsaturation units/100,000 C of the copolymer follows the inequality (II)

$$y > 0.12B + 39.38 \quad (II)$$

wherein y is the total unsaturation/100 000 C atoms and B is the 1-octene content of the copolymer in wt. %.

3. The ethylene-1-octene copolymer according to claim 1, wherein the melt flow rate $MFR_2$ (190° C., 2.16 kg) is in a range of from 0.8 g/10 min to 90 g/10 min measured according to ISO 1133.

4. The ethylene-1-octene copolymer according to claim 1, wherein the ratio $MFR_{10}/MFR_2$ is in a range of from 6.0 to 13.0 measured according to ISO 1133.

5. The ethylene-1-octene copolymer according to claim 1, wherein the Mw/Mn is in a range of 2.4 to 4.0 determined by gel permeation chromatography.

6. The ethylene-1-octene copolymer according to claim 1, wherein the vinyl unsaturation degree is in a range of from 7.0 to 17.0%.

7. The ethylene-1-octene copolymer according to claim 1, wherein a vinylidene unsaturation degree is in a range of from 20.0 to 32.0%.

8. The ethylene-1-octene copolymer according to claim 1, wherein a vinylidene unsaturation degree is in a range of from 22.0 to 28.0%.

9. The ethylene-1-octene copolymer according to claim 1, wherein a vinylene unsaturation degree is in a range of from 14.0 to 28.0%.

10. The ethylene-1-octene copolymer according to claim 1, wherein a trisubstituted unsaturation degree is in a range of from 35.0 to 50.0%.

11. The ethylene-1-octene copolymer according to claim 1, wherein a trisubstituted unsaturation degree is in a range of from 36.0 to 45.5%.

12. The ethylene-1-octene copolymer according to claim 1, wherein the 1-octene is present in an amount of 10 to 45 wt % based on a weight of the total copolymer.

13. Process for producing the ethylene-1-octene copolymer according to claim 1 in a continuous high temperature solution process at a temperature from 120° C. to 250° C. and a pressure of 50 to 300 bar, the process comprising at least the steps of:

(A) polymerizing in at least a first polymerization reactor in a first solvent ethylene monomer and 1-octene comonomer in the presence of a first polymerization catalyst and optionally a chain transfer agent for producing a first solution comprising a first ethylene-1-octene copolymer and the first solvent;

whereby the first solvent, ethylene monomer and 1-octene comonomer are provided in a first feed stream; and wherein the first polymerization reactor is operated under operating conditions which ensure that reactor contents form a single homogenous phase, (B) withdrawing a first stream of the first solution from the first polymerization reactor, (C) separating the first ethylene-1-octene copolymer from the first stream of step (B), wherein the first polymerization catalyst comprises:

(i) at least one metallocene complex of formula (I)

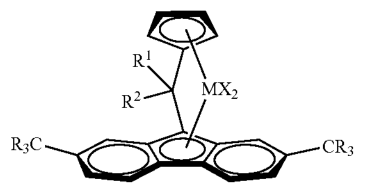

wherein

M is hafnium,

R are the same or different from each other and can be a saturated linear or branched C1 to C10 alkyl, $R^1$ is an unsubstituted C6 to C10 aryl, and $R^2$ is a C4 to C20 cycloalkyl group or a C4 to C6 alkenyl group, X is a C1 to C6 alkyl, and (ii) a boron containing cocatalyst.

14. The process according to claim 13, further comprising the steps of (D) polymerizing in a second polymerization reactor in a second solvent ethylene monomer and 1-octene comonomer in the presence of a second polymerization catalyst and optionally a chain transfer agent for producing a second solution comprising a second ethylene-1-octene copolymer and the second solvent;

whereby the second solvent, ethylene monomer and 1-octene comonomer are provided in a second feed stream; and wherein the second polymerization reactor is operated under operating conditions which ensure that reactor contents form a single homogenous phase, (E) withdrawing a second stream of the second solution from the second polymerization reactor, (F) separating the second ethylene-1-octene copolymer from the second stream of step (E), and (G) combining the first ethylene-1-octene copolymer of step (C) with the second ethylene-1-octene copolymer of step (F), wherein the second polymerization catalyst comprises:

(i) at least one metallocene complex of formula (I)

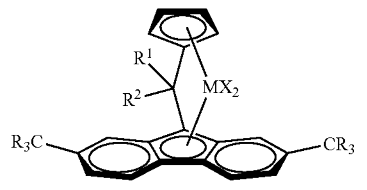

wherein

M is hafnium,

R are the same or different from each other and are a saturated linear or branched C1 to C10 alkyl, $R^1$ is a unsubstituted C6 to C10 aryl, and $R^2$ is a C4 to C20 cycloalkyl group or a C4 to C6 alkenyl group, X is a C1 to C6 alkyl, and (ii) a boron containing cocatalyst, and wherein the first polymerization catalyst and the second polymerization catalyst are the same or different from each other.

15. The process according to claim 13, wherein the at least one metallocene complex of formula (I) is a metallocene complex of formula (la)

(Ia)

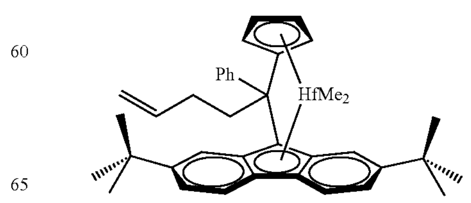

and/or a metallocene complex of formula (lb)

(Ib)

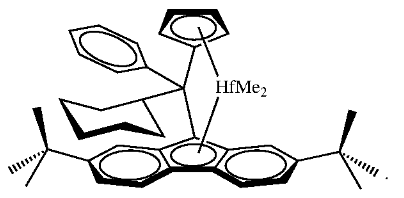

16. The process according to claim 13, wherein a comonomer reactivity according to formula (II)

$$\text{Comonomer Reactivity} = (C8/C2)_{polymer}/(C8/C2)_{feed} \quad \text{(II)}$$

is >0.28 up to 0.65, wherein in formula (II)

$(C8/C2)_{polymer}$ is a ratio of wt % of 1-octene/wt % of ethylene in the ethylene-1-octene copolymer and (C8/C2) feed is a ratio of wt % of 1-octene/wt % of ethylene in the first feed stream, or in a sum of first feed stream and the second feed stream.

17. The process according to claim 13 wherein the boron containing cocatalyst comprises an anion of formula (III)

wherein Z is an optionally substituted phenyl derivative, wherein a substituent is a halo-C1-6-alkyl or halo group.

18. The process according to claim 13, wherein the boron containing cocatalyst is a borate selected from the group consisting of triphenylcarbenium tetrakis (pentafluorophenyl) borate, N,N-dimethylcyclohexylammonium tetrakis (pentafluorophenyl) borate, N,N-dimethylbenzylammonium tetrakis (pentafluorophenyl) borate, and N,N-dimethylanilinium tetrakis (pentafluorophenyl) borate.

19. A process, comprising grafting the ethylene-1-octene copolymer according to claim 1 with comonomer units comprising hydrolysable silane groups to obtain a grafted ethylene-1-octene copolymer comprising hydrolysable silane groups.

* * * * *